Figure 1:
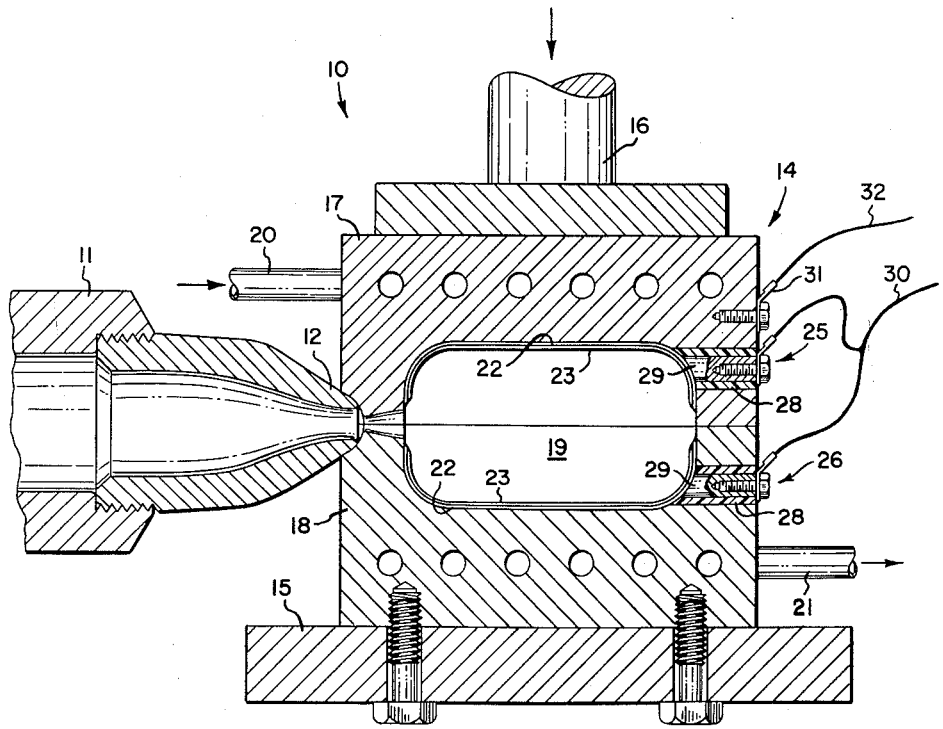

April 18, 1961   L. L. BOLSTAD   2,979,773
MOLDING APPARATUS
Filed Aug. 26, 1959

INVENTOR.
LUTHER L. BOLSTAD
BY
ATTORNEY

United States Patent Office 2,979,773
Patented Apr. 18, 1961

2,979,773

MOLDING APPARATUS

Luther L. Bolstad, St. Louis Park, Minn., assignor to Minneapolis-Honeywell Regulator Company, Minneapolis, Minn., a corporation of Delaware Filed Aug. 26, 1959, Ser. No. 836,270

1 Claim. (Cl. 18—34)

The present invention relates generally to an improved apparatus and process for molding plastic bodies, particularly molding plastic bodies utilizing thermoplastic resins. More specifically, the invention relates to an improved apparatus for molding plastic substances of this type employing an improved heating assembly for molding plastic substances, the apparatus being particularly adapted to effectively speed-up the molding cycle and thereby substantially diminish the down-time required for each plastic molding cycle while maintaining a high quality in the molded part.

In the past, various heating techniques have been employed in the preparation of devices for injection molding of plastic materials. The apparatus may have included either a heated liquid which was passed through the molding body, or a particular type of electrical element was imbedded in the body to raise the temperature of the unit to the level required for efficient molding of the product within the mold cavity. Because of the relatively high pressures normally encountered during the molding operation, it is essential that the mold cavity be formed around molding surfaces which possess substantial mechanical rigidity and strength. While these requirements may be relatively easily met and the mold appropriately designed therearound, the heating arrangements for such a mold become increasingly cumbersome. The thermal lag in heating and cooling a mold cavity effectively limits the time during which the molding machine may be effectively operated. As this lag time increases, the down-time for the mold is correspondingly increased, this being at the expense of effective operation of the unit.

According to the present invention, a substantial shortening of the molding cycle over conventional compression molding techniques for example is obtainable by means of an auxiliary surface heating arrangement which provides an additional heat source for the surface of the molding cavity, the auxiliary heating arrangement having a very low heating requirement, along with a low thermal capacity. Briefly, according to the invention, a thin semiconductive film is applied on the surface of a molding cavity. A relatively thin electrode is applied on one surface of the semiconductive film and electrical contact is available to the other surface through the mold body per se, electrical contact thereby being established thereacross. Suitable means are arranged for bringing in the appropriate electrical leads to the semiconductive film. In order that the required electrical potential may be maintained across the film, thereby maintaining the resistance of the film and the heating capability thereof at the desired level, a thin film of a suitable thermoset material may be employed, the thermoset material of resin having an appropriate electrical resistivity. Of course, for certain molding and heat treating operations, the improved apparatus of the present invention may simply employ a single surface heater in accordance with the present invention. The heating arrangement of the present invention, when employed as an auxiliary source, may be utilized in particular portions of the mold cavity where it is otherwise relatively difficult to obtain the high temperatures normally desired in the particular molding operation or cycle.

It is therefore an object of the present invention to provide an improved molding apparatus and technique wherein a surface area is arranged to have independent heating means positioned thereon, the heating means being capable of supplying thermal energy relatively rapidly and also having an extremely low heat capacity.

It is a further object of the present invention to provide an improved molding apparatus which is arranged to provide a heating source for a mold cavity which may provide heat along a mold surface as required.

Figure 2:
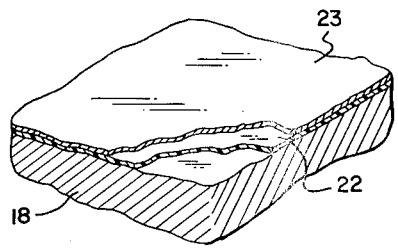

Other and further objects of the present invention will become apparent from a study of the following specification, appended claim, and accompanying drawings in which:

Figure 1 is a vertical sectional view of one form of an apparatus employing the principles of the present invention; and Figure 2 is a perspective view on a substantially increased scale showing the thin heating film prepared in accordance with the present invention and applied to a molding cavity surface.

According to the preferred modification of the present invention, an injection molding apparatus generally designated 10 is illustrated in Figure 1 of the drawings. The unit is provided with any suitable injection sprue 11 having a tip 12 which is arranged to be received in the body of a mold member generally designated 14. Mold 14 is provided with a suitable support 15 and is attached to the body thereof by any suitable means. A pressure or force-supplying member 16 is likewise provided for the mold 14, the apparatus being designed to apply pressure in the direction of the arrow as required in certain phases of the molding cycle. The chief requirement of the pressure supplying means, as is well known in the plastic molding art, is that the pressure be adequate to prevent excessive flash from accumulating on the molded part due to inadequate pressure being supplied against the parts forming the cavity. The mold body 14 comprises a pair of members 17 and 18 which cooperate to provide a mold cavity or chamber 19. The sprue member, of course, is arranged in suitable communicating relationship with the chamber 19. As is likewise conventional in the art, a heating or heating and cooling system is provided in the apparatus, the mold 14 being provided with an appropriate network of fluid transmitting channels within the confines of the mold members. In this connection, such a system is illustrated in Figure 1 of the drawings, the inlet 20 and the outlet 21 being specifically illustrated. The network is further provided with suitable channels within the mold member in order to transfer the heating or heating and cooling liquid as required throughout the body of the mold 14. Along that portion of the mold body 14 which forms the inner wall or surface of the mold chamber 19, there is provided a relatively thin film of a semiconducting material such as an electrically conductive cured phenolic resin or the like. This film is preferably made very thin in cross section and is arranged to have an electrical resistivity of between about 1,000 and 100,000 ohm centimeters. Outwardly thereof, there is placed a conductive electrode in order to provide for electrical conductivity across the semiconductive phenolic film. Reference is made to Figure 2 wherein the various features of the mold are given in somewhat greater detail, particularly with regard to the application and positioning of the semiconductive film along the surface of the mold 14. Accordingly, the base member which may be a small portion selected from the member 18 of mold body 14 for example, is coated with a relatively thin film of a semiconductive material as shown at 22. A suitable conductive electrode is placed on the surface of the semiconductive film and is accordingly provided with a suitable electrical lead for passing an electrical current through the semiconductive film 22. Of course, it may be possible to simplify the attachment of electrodes by merely passing an insulated lead through the juncture of the two mold segments 17 and 18 at a point which is preferably removed from the area of the sprue 12. In this case, electrical contact is thereby made to the outer electrodes 23 by means of a single electrical contact member. In such a case, it will be likewise unnecessary to segregate or separate the outer electrodes 23—23, one from the other. Referring back to Figure 1, each half, 17 and 18, of the mold member 14 is provided with a suitable electrical lead-through to the electrode 23. An appropriate mechanism is shown at 25 and 26, each of the lead-throughs being electrically insulated from the body of the mold 14 by a suitable grommet 28. A conductive member 29 is accordingly positioned within the confines of the grommet 28 and is arranged to carry an electrical current and thereby provide a suitable potential across conductive film 22. A suitable electrical lead 30 is provided for bringing electrical energy into the electrical lead-throughs 25 and 26. The other electrical contact is made to the body of the mold 14 through any suitable connection 31, the other lead, if desired, being designated 32.

In operation, a suitable thermoplastic resin is injected through the sprue 11 into the mold chamber 19, the chamber being somewhat below that required to maintain the resinous substance fused. Electrical energy is applied across conductors 30 and 32 and an appropriate heating current is thereby passed through the semiconductive film and the desired temperature rise achieved. In this connection, the surface portion only of the mold cavity 19 experiences this rise in temperature provided by the semiconductive film 22, the time during which the current is passed through the film being appropriately short. This rise in temperature is sufficient to render the surface of the molded product substantially free from internal stresses, craze lines and the like. In addition, when application of the electrical energy across the leads 30 and 32 is terminated, the surface cools rapidly and the entire enclosure assumes the somewhat lower temperature of the mass of the mold member 14. This sudden drop in temperature provides at least a portion of the heat dissipation required prior to opening the mold for thermoplastic bodies, and accordingly a substantial decrease of the time required to cool the assembly to a point desired for safe removal of the part from the cavity 19 is accomplished.

In one specific application, a phenolic resin identified under the code name Resinox, Number 3850 and sold by the Monsanto Company of Springfield, Massachusetts, was filled with an electrically conductive furnace black until the resin achieved a resistivity of about 1,000 ohms centimeters. The loaded Resinox, Number 3850 was then spread out across the face of the mold body to a thickness of 0.020 inch. For best results, any semiconductive material employed in such a fashion should reasonably have a cross sectional thickness of greater than 0.010 inch but preferably not in excess of 0.030 inch. When films of this type are prepared having a thickness in excess of 0.030 inch, excessive resistance may be encountered and excessive heat capacity due to the bulk of the film may also be encountered. Such a thick film may unreasonably increase the time required to cool the molded body. A thin electrical conductive film of aluminum having a thickness of about 1 mil was arranged across the surface of the phenolic and provided the other electrical connection thereto. Shorting of the electrode leads between the electrically conductive film and the mold body was prevented by the means of terminating the conductive electrode at a point inside the periphery of the semiconductive film layer.

Further modifications may be made of the present invention without departing from the scope thereof. It will be accordingly understood that the specific examples given herein are for purposes of illustration only and are not to be construed as a limitation on the invention.

I claim as my invention:

Plastic molding apparatus including a plurality of cooperating mold members with means for maintaining said mold members at a first predetermined temperature, said mold members having a plurality of molding surfaces defining a mold chamber, said molding chamber being arranged to receive a molten plastic charge therein at a second predetermined temperature, said second predetermined temperature being above the flow temperature of said plastic and higher than said first predetermined temperature, said molding surfaces being characterized in that a relatively thin semiconductive film is arranged adjacent to and in good heat transfer relationship therewith, a relatively thin metallic electrode arranged along substantially the entire surface of said semiconductive film, and means for passing an electrical current through said semiconductive film thereby temporarily heating said molding surface above said second predetermined temperature.

References Cited in the file of this patent

UNITED STATES PATENTS

| 2,289,791 | Loftis et al. | July 14, 1942 |
| 2,458,864 | Lindsay | Jan. 11, 1949 |
| 2,679,569 | Hall | May 25, 1954 |
| 2,841,823 | Van Hartesveldt | July 8, 1958 |